(12) United States Patent
Branden

(10) Patent No.: US 7,035,293 B2
(45) Date of Patent: Apr. 25, 2006

(54) TONE RELAY

(75) Inventor: Scott Branden, Surrey (CA)

(73) Assignee: Broadcom Corporation, Irvine, CA (US)

(*) Notice: Subject to any disclaimer, the term of this patent is extended or adjusted under 35 U.S.C. 154(b) by 837 days.

(21) Appl. No.: 09/933,035

(22) Filed: Aug. 20, 2001

(65) Prior Publication Data
US 2002/0154760 A1 Oct. 24, 2002

Related U.S. Application Data

(60) Provisional application No. 60/284,969, filed on Apr. 18, 2001.

(51) Int. Cl.
H04J 3/12 (2006.01)
(52) U.S. Cl. .......... 370/526; 370/283; 370/386
(58) Field of Classification Search ............ 370/526, 370/494, 495, 497, 283, 386; 379/283, 386
See application file for complete search history.

(56) References Cited

U.S. PATENT DOCUMENTS 5,572,588 A * 11/1996 Weng et al. .......... 379/386
5,666,357 A * 9/1997 Jangi .................. 370/345
6,400,709 B1 * 6/2002 Yousseff ............... 370/352
6,591,234 B1 * 7/2003 Chandran et al. ......... 704/225
6,650,662 B1 * 11/2003 Arnaud et al. .......... 370/526
2002/0076034 A1 * 6/2002 Prabhu et al. ........ 379/390.02
2002/0080953 A1 * 6/2002 Harada ................ 379/386

FOREIGN PATENT DOCUMENTS

WO  WO 00/05905      2/2000
WO  WO 01/13586 A1   2/2001

OTHER PUBLICATIONS

European Search Report dated Oct. 5, 2005 for corresponding International Application No. EP 02 09 0146, in the name of Broadcom Corporation, 3 pages.

* cited by examiner

Primary Examiner—Seema S. Rao
Assistant Examiner—Jay P. Patel
(74) Attorney, Agent, or Firm—Christie, Parker & Hale, LLP

(57) ABSTRACT

A system and method for detecting and removing tones from an incoming communications channel that may also carry other signals such as, for example, voice is disclosed which includes pre-detecting tones in a communication signal, processing the communication signal to invalidate the tones in response to the tone pre-detection, forwarding the processed communication signal across a network, validating the tone and forwarding tone-on signals across the network in response to the validation.

28 Claims, 5 Drawing Sheets

TONE RELAY

CROSS-REFERENCE TO RELATED APPLICATION

This application claims priority to U.S. Provisional Patent application Ser. No. 60/284,969, entitled DTMF RELAY filed on Apr. 18, 2001, the contents of which are incorporated herein by reference.

FIELD OF THE INVENTION

The present invention generally relates to telecommunications systems, and more particularly, to a method and apparatus for processing tones in a voice stream.

BACKGROUND

In telecommunication systems, the use of in-band tones for signaling is common. For example, touch-tone phones commonly use a tone that is formed of two component tones to send digits in a signaling scheme called dual-tone multi-frequency (DTMF). Dual tone signals are also used in customer premise equipment alert signaling (CAS), subscriber alert signaling (SAS) and as visual screen list editing (VSLE) tones.

However, in conventional tone relays, leakage through the voice path can result in the false detection of tones on the far end of the network. Therefore, to avoid tone leakage into the voice path, conventional systems may queue (but not release) the voice samples in the encoder system. For example, the voice encoder may be delayed by the maximum time that is necessary to guarantee the detection of a tone (about 40 msec in the case of a DTMF tone). Such a delay would result in zero leakage through the voice path but may negatively affect voice quality because it adds 40 msec of delay to the system. In addition, in memory limited systems, 40 msec of extra buffering is required in the ingress direction.

Alternatively, some systems pre-detect tones through a combination of tone decisions and state machine processing. Typically the incoming signal is queued if a tone is predetected. The tone detector typically makes a decision (i.e. is there a tone present) every five-fifteen msec. If the detection was false (invalid), the voice samples are ultimately released, otherwise they are discarded. This manifests itself as jitter when tones are falsely pre-detected. The extra jitter introduced due to false early tone detections may result in lost packet, frame repeats, and/or increased system delay.

Therefore, it would be advantageous to provide a method and apparatus for the detection and removal of frequency tones in voice signals without introducing significant jitter or delay into the signal.

SUMMARY OF THE INVENTION

In one aspect of the present invention, a method for relaying signaling tones in a communication signal across a network includes pre-detecting the tones, processing the communication signal to invalidate the tones in response to the tone pre-detection, forwarding the processed communication signal across the network, validating the tone and forwarding tone-on signals across the network in response to the validation.

In another aspect of the present invention, a tone relay or communicating signaling Jones across a network includes validation logic coupled to a tone detector for pre-detecting tones in an incoming signal, invalidation logic for processing the incoming signal to invalidate the tones in response to the tone pre-detection, and an encoder for encoding the processed signal in accordance with an applications protocol.

In a further aspect of the present invention a data transmission system includes a telephony device which outputs a signal and a signal processor including validation logic coupled to a tone detector for pre-detecting tones in the signal, invalidation logic for processing the signal to invalidate the tones in response to the tone pre-detection, and an encoder for encoding said processed signal in accordance with an applications protocol.

BRIEF DESCRIPTION OF THE DRAWINGS

These and other features, aspects, and advantages of the present invention will become better understood with regard to the following description, appended claims, and accompanying drawings, in which:

DETAILED DESCRIPTION OF THE INVENTION

An exemplary embodiment of the present invention provides a method and apparatus for detecting and removing tones from an incoming communications channel that may also carry other signals such as, for example, voice. The described exemplary embodiment, further provides for the regeneration of those tones on a far end of the network, preferably with reduced talk-off errors.

Figure 1:
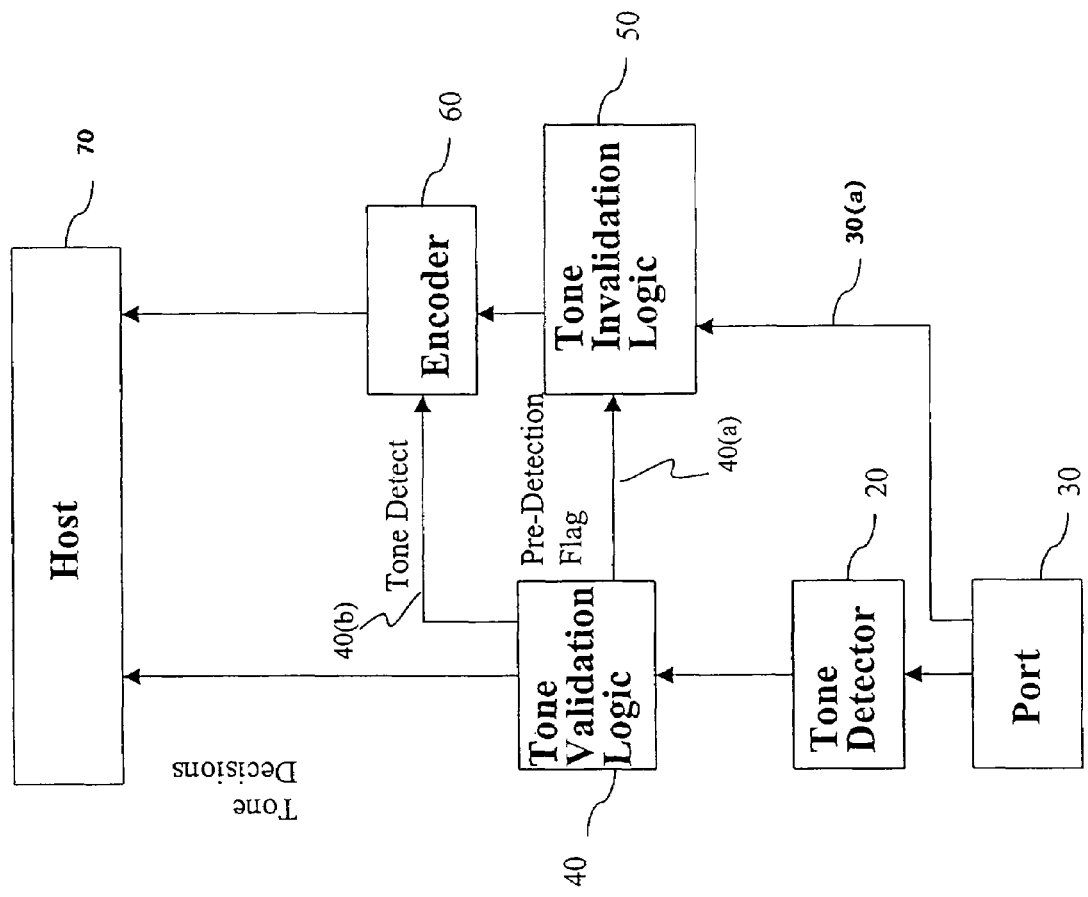
FIG. 1 is a simplified block diagram of a tone relay in accordance with an exemplary embodiment of the present invention

Referring now to FIG. 1, a simplified block diagram of a tone relay according to an exemplary embodiment of the present invention is shown. In the described exemplary embodiment the tone relay may be integrated into a voice encoder system. The described exemplary voice encoder system comprises a port or connector or other means 30 for receiving analog or digital signals. This signal may represent information received from a subscriber in a telecommunication system and may include tones as well as information such as voice, noise, or other signals carried by the channel.

The port 30 is adapted for coupling to a communications medium, such as a phone line, cable, fiber optic or other transmission line. In the illustrative embodiment, the data is processed in a digital format to determine if a tone digit has been received. However, it will be apparent to those skilled in the art that analog components or a combination of analog and digital implementations could be utilized to perform the steps and elements in accordance with the illustrative embodiment of the present invention.

The described exemplary tone relay further comprises a tone detector 20 coupled to the port 30. The tone detector 20 may comprise for example a dual tone detector that splits input signal along parallel processing paths, wherein one processing path detects the presence of a high frequency tone, and the other path detects the presence of a low frequency tone. Tone validation logic 40 coupled to the tone detector 20 may then determine if other parameters, such as for example, tone duration, relative amplitude ranges between component tones, allowable frequency variation of the component tones, etc. as required by the governing standard are satisfied.

The described exemplary tone relay may mute the received digital voice samples, or discard voice frames when tones are detected. In addition, to avoid tone leakage into the voice path, tones may be pre-detected through a combination of tone decisions and state machine processing. In the described exemplary embodiment the tone validation logic 40 makes a decision (i.e. is there a tone present) about every five-ten msec. In the case where a tone is pre-detected, the tone validation logic 40 forwards a pre-detection flag 40(*a*) to tone invalidation logic 50.

In response to the pre-detection flag, the tone invalidation logic 50 processes the incoming signal 30(*a*) to ensure that a tone is not detected in the processed signal when it is received on the far end of the network. One of skill in the art will appreciate that a variety of methods for invalidating multi-tone signals may be utilized to minimize tone leakage into the voice path. In operation, however, the method of invalidating the tone signals may be optimized in accordance with the computational and memory limitations of the communication channel as well as the impacts on other signals, such as for example, voice on the channel.

For example, tone validation on the far end typically allows for one and only one tone in each of the tone groups. Thus, only one low frequency tone and one high frequency tone may be present during each sample of a valid tone. Therefore, the tone invalidation logic 50 may invalidate tones in the incoming signal by adding a second tone in either the low frequency or high frequency tone groups. Similarly, another method to invalidate a dual tone signal is to frequency shift the tone so that it sounds close to the same spectral content as the original, but the tone is not at the correct frequency.

Alternatively, tone invalidation logic may buffer an incoming signal and retransmit the data that was received prior to the pre-detection of a tone rather than transmitting a processed tone. Re-transmitting buffered data invalidates the tone on the other end with minimal impact on other signals on the channel because the spectral content of the retransmitted data is close to the spectral content of data that was recently played out on the other end.

In the described exemplary embodiment, the tone invalidation logic 50 outputs a processed signal to a voice encoder 60 that may comprise, for example, a straight 16 bit PCM encoder or any voice encoder that supports one or more of the standards promulgated by ITU. Substantially delay free encoded digital voice samples are then forwarded to the host for communication across the network.

In the described exemplary embodiment, the tone validation logic 40 forwards a tone detection event to the voice encoder 60 when the presence of a tone has been validated. In the described exemplary embodiments the voice encoder 60 terminates operation and tone events are reported to the host 70. This allows the host, for example, to convert a DTMF sequence of keys to a destination address and to support call routing via DTMF. The described exemplary embodiment, therefore provides a method and apparatus for substantially reducing tone leakage into the voice path that does not require signal queuing or delay that might otherwise introduce jitter or other undesirable artifacts into the system.

While the present invention is open to various modifications and alternative constructions, it will be beneficial to describe the invention in the context of an exemplary communication channel. It is to be understood, however, that there is no intention to limit the invention to the particular forms disclosed. On the contrary, it is intended that the invention cover all modifications, equivalences and alternative constructions falling within the spirit and scope of the invention as expressed in the appended claims.

For example, an exemplary embodiment of the present invention may be utilized as a dual tone multi-frequency relay in a signal processing system, employed to interface telephony devices with packet based networks. Telephony devices include, by way of example, analog and digital phones, ethernet phones, Internet Protocol phones, fax machines, data modems, cable modems, interactive voice response systems, PBXs, key systems, and any other conventional telephony devices known in the art.

The described exemplary embodiment of the signal processing system may be implemented with a variety of technologies including, by way of example, embedded communications software that enables transmission of information, including voice, fax and modem data over packet based networks. The embedded communications software is preferably run on programmable digital signal processors (DSPs) and is used in gateways, cable modems, remote access servers, PBXs, and other packet based network appliances.

Figure 2:
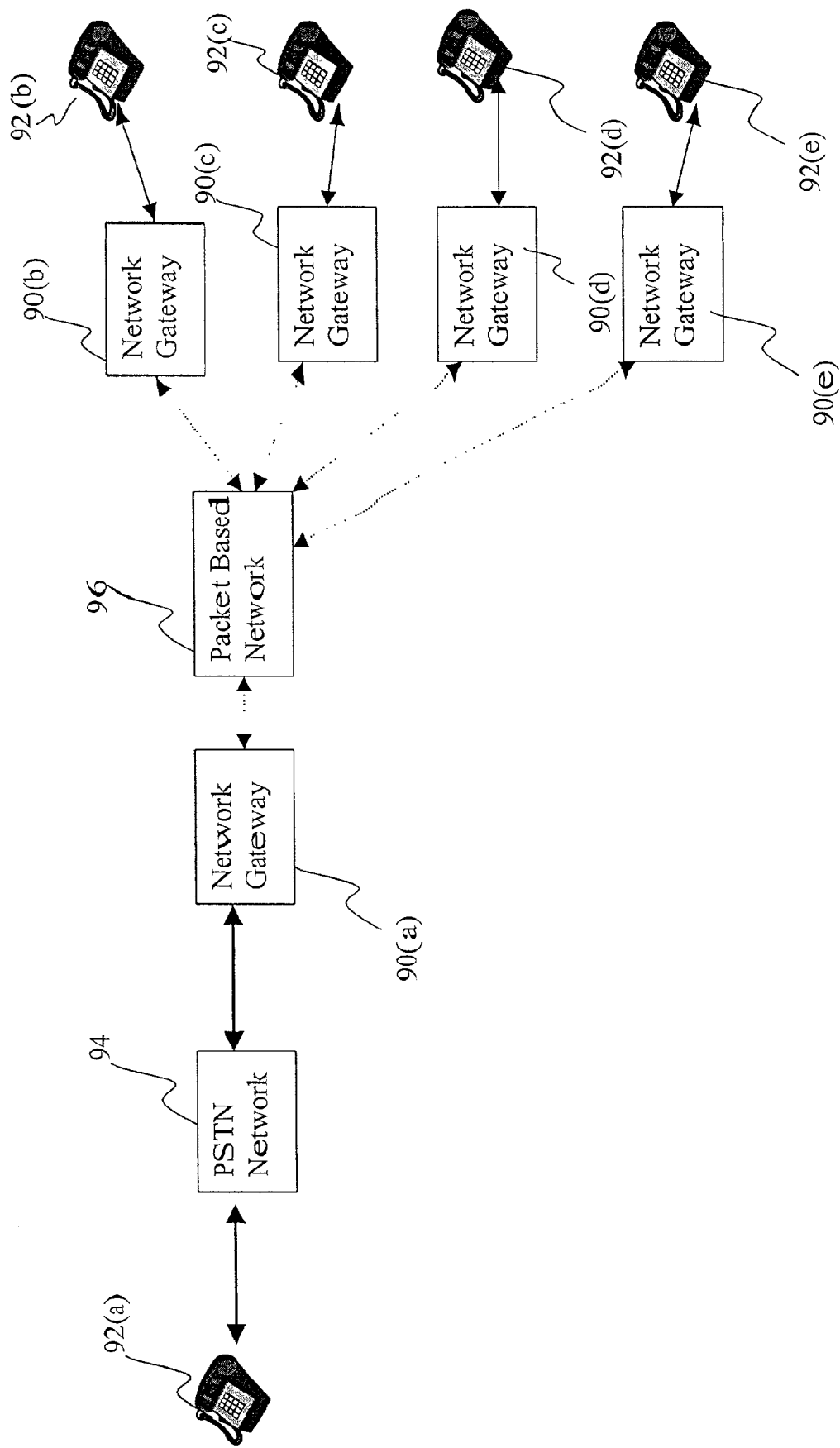
FIG. 2 is a simplified block diagram of a network for interfacing between a switched circuit network and a packet based network in accordance with an exemplary embodiment of the present invention.

As shown in the exemplary embodiment depicted in FIG. 2, the signal processing circuitry, embodied in for example a network gateway, enables the transmission of voice over a packet based system such as Voice over IP (VoIP, H.323), Voice over Frame Relay (VoFR, FRF-11), Voice Telephony over ATM (VTOA), or any other proprietary network. The signal processing system may also permit voice to be carried over traditional media such as time division multiplex (TDM) networks and voice storage and playback systems.

Network gateway 90*a* supports the exchange of voice between a traditional circuit switched 94 and a packet based network 96. In addition, network gateways 90*b*, 90*c*, 90*d*, 90*e* support the exchange of voice between the packet based network 96 and a number of telephones 90*a*, 90*b*, 90*c*, 90*d*, 90*e*. Although the described exemplary embodiment is shown for telephone communications across the packet based network, it will be appreciated by those skilled in the art that other telephony/network devices could be used in place of one or more of the telephones, such as a HPNA phone connected via a cable modem.

The signal processing systems comprises an encoder system with DTMF detection, and a decoder system with DTMF generation. DTMF (dual-tone, multi-frequency) tones are signaling tones carried within the audio band. A dual tone signal is represented by two sinusoidal signals whose frequencies are separated in bandwidth and which are uncorrelated to avoid false tone detection. A DTMF signal includes one of four tones, each having a frequency in a high frequency band, and one of four tones, each having a frequency in a low frequency band. The frequencies used for DTMF encoding and detection are defined by various ITU and Bellcore standards and are widely accepted around the world. These standards involve various criteria, such as frequency distortion allowance, twist allowance, noise immunity, guard time, talk-down, talk-off, acceptable signal to noise ratio, dynamic range, etc.

As is known in the art, each valid DTMF digit consists of the simultaneous transmission of one tone from a low frequency group ranging in frequency from 697–941 Hz and an high frequency group ranging in frequency from 1209–1633 Hz. It will be apparent that for a typical voice frequency channel such as from 300–3000 Hz, the tones constitute in-band signaling. Thus, other signals including speech may also generate signals of the same frequencies utilized by the DTMF tones.

Additional parameters specify requirements for valid digit detection. For example, a distortion allowance criteria specifies that a DTMP detector should detect a transmitted signal that has a frequency distortion of less than 1.5% and should not detect any DTMF signals that have frequency distortion of more than 3.5%. The term "twist" refers to the difference, in decibels, between the amplitude of the strongest key pad column tone and the amplitude of the strongest key pad row tone. For example, the bellcore standard requires the twist to be between −8 and +4 dBm. The noise immunity criteria requires that if the signal has a signal to noise ratio (SNR) greater than certain decibels, then the DTMF detector is required to not miss the signal, i.e., is required to detect the signal. Different standards have different SNR requirements, which usually range from 12 to 24 decibels.

The guard time check criteria requires that if a tone has a duration greater than 40 milliseconds, the DTMF detector is required to detent the tone, whereas if the tone hag a duration less than 23 milliseconds, the DTMF detector is required to not detect the tone. Similarly, the DTMF detector is required to accept inter-digit intervals which are greater than or equal to 40 milliseconds. Alternate embodiments of the present invention readily provide for compliance with other telecommunication standards such as EIA-464B, and JJ-20.12.

Thus, it will be apparent that the breadth of conditions and variations that must be tolerated places burdens on a DTMF receiver, especially considering the desirability to minimize talk-off, jitter and other voice and signal interfering conditions.

Figure 3:
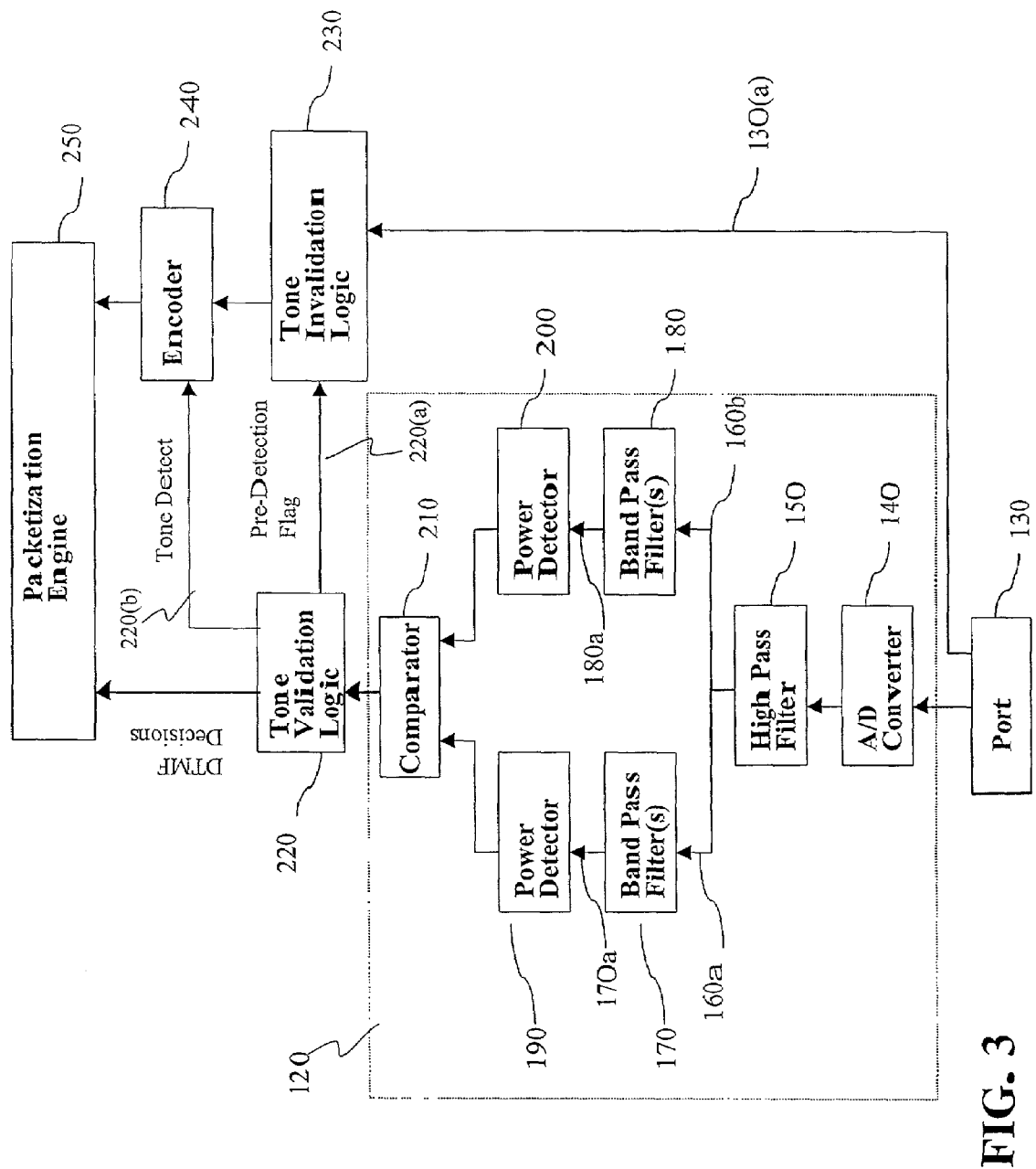
FIG. 3 is a simplified block diagram of a DTMF tone relay in accordance with an exemplary embodiment of the present invention.

Referring now to FIG. 3, a simplified block diagram of a tone relay according to an exemplary embodiment of the present invention is shown. The described exemplary voice encoder system includes a port or connector or other means 130 for receiving analog or digital signals. This signal may represent information received from a subscriber in a telecommunication system and may include tones as well as information such as voice, noise, or other signals carried by the channel. The port 130 is adapted for coupling to a communications medium, such as a phone line, cable, fiber optic or other transmission line.

The described exemplary tone relay further comprises a tone detector 120 coupled to the port 130. The tone detector may include an A/D converter 140 to convert received analog signals into digital format. It is noted that the received signal may be compressed or companded, and thus digital data produced by the A/D converter 140 in the tone detector may be companded, i.e., may comprise logarithmically compressed digital data. As is well-known in the art, companding refers to logarithmically compressing a signal at the source and expanding the signal at the destination to obtain a high end-to-end dynamic range while reducing dynamic range requirements within the communication channel. In this instance, the tone detector logarithmically expands the data to a linear format, preferably a 16 bit linear format.

The tone detector may further include a high pass filter 150 to attenuate power line frequency components at 60 Hz and harmonics of such power line components. In a multi-tone system, the input signal may be split and sent along parallel processing paths 160a and 160b. For example, in the described exemplary dual tone system, one processing path detects the presence of a high frequency tone 160a, the other path detects the presence of a low frequency tone 160b.

In the described exemplary tone detector, the processing paths pass the input signal through bandpass filters 170 and 180, each bandpass filter being associated with and preferably centered on one of the component tones. The filtered signals 170a and 180a are then passed through power detectors 190 and 200 respectively and a comparator 210 to determine if the signals are of sufficient strength. In the described exemplary embodiment, tone validation logic 220 may then determine if other parameters are satisfied. For example, the validation logic may compare the frequency identified for the upper and lower bands to predetermined frequency pairs identified in the controlling standard, such as, for example the ITU-T recommendations to identify a digit.

The described exemplary tone relay may pre-detect DTMF tones to prevent tone leakage into the voice path. In operation, the validation logic 220 makes a decision (i.e. is there a tone present) about every five-ten msec. In the case where a tone is pre-detected, the validation logic forwards a pre-detection flag 220a to tone invalidation logic 230. In response to a pre-detection flag, the tone invalidation logic 230 processes the incoming signal 130(a) to ensure that a valid DTMF digit is not detected on the far end of the network, preferably without significantly degraded voice or other signals that may be present on the channel.

In accordance with an exemplary embodiment, tone invalidation logic 230 may comprise a band stop filter that invalidates the high frequency tone. In operation, the impacts on the quality of voice signals present on the channel may be minimized if the stop band filter only removes the particular high frequency tone that was pre-detected in the DTMF signal. However, this requires four different filters which adds considerable complexity to the design of the system. Therefore, in the described exemplary embodiment the tone invalidation logic may comprise a band stop filter that substantially filters or removes the entire high frequency tone group.

The removal of the high frequency tone group might be noticeable in speech if done for a long duration. However, the tone invalidation logic is typically active for a relatively short period of time in accordance with the guard time check criteria for the protocol in use. For example, for a DTMF digit, tone validation logic may reject all tones with a duration less than about 23 msec and accept all tones with a duration greater than 40 msec. Therefore, in operation the described exemplary embodiment corrupts or processes the incoming signal to invalidate the tone for a limited time, typically on the order or 5–30 msec during a false detection.

Further, the occurrence of a false tone pre-detection in normal speech is relatively rare. In addition, tones that are incorrectly pre-detected are often invalidated by the validation logic during the next decision point, typically on the order of five-ten msec later. Filtering the high frequency group for such short durations is typically not noticeable in normal conversations and therefore results in minimal degradation of the actual voice quality of the communication channel.

Figure 4:
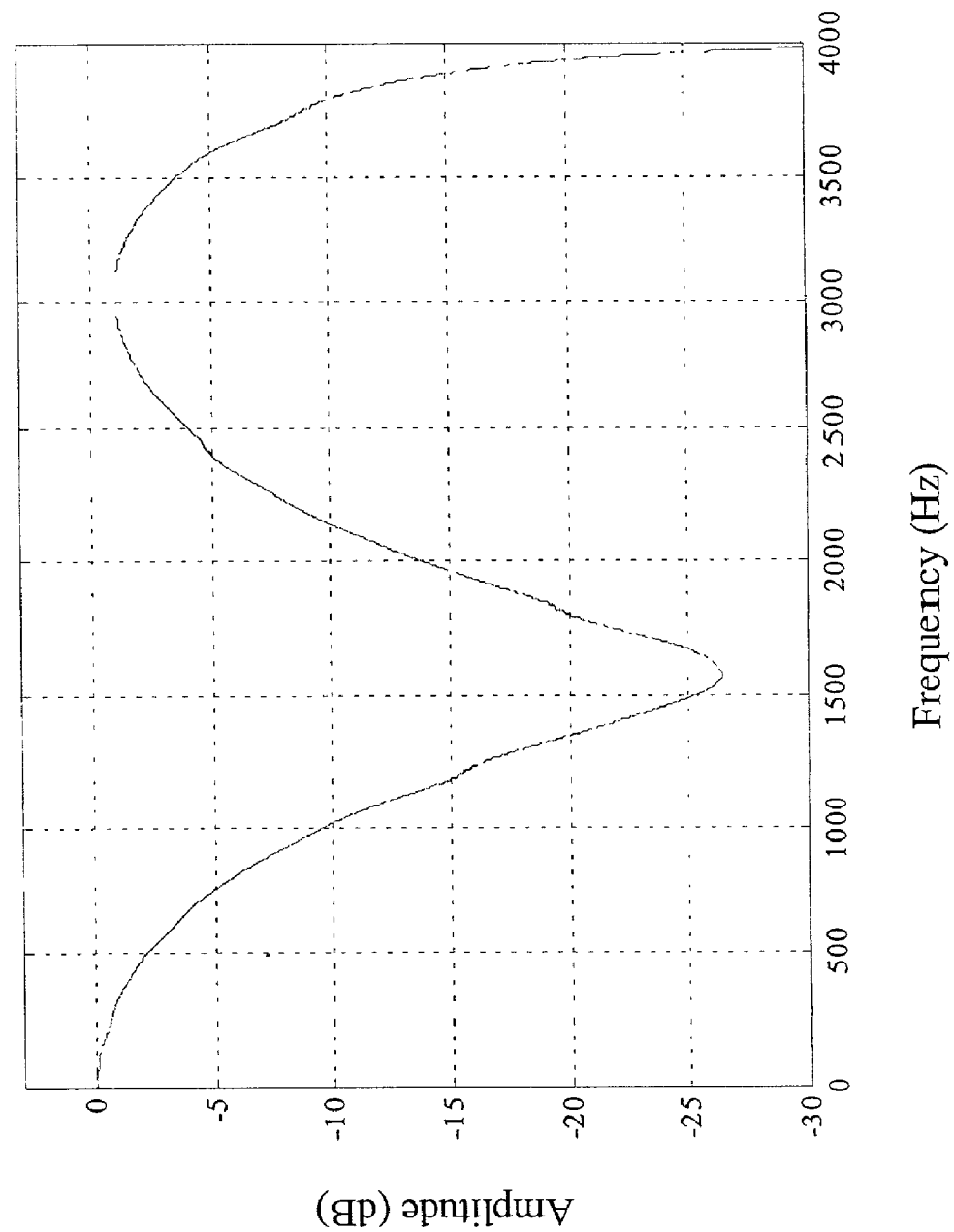
FIG. 4 graphically illustrates the frequency response of an exemplary stop band filter for invalidating the high frequency none group in a predetected DTMF signal in accordance with an exemplary embodiment of the present invention.

Accordingly, the described exemplary embodiment may utilize a fifth order symmetric (linear phase) FIR filter may to invalidate the high frequency tone group. The frequency response of the described exemplary stop band filter is graphically illustrated in FIG. 4. In operation the constant group delay through the filter may cause the filtered output to be delayed with respect to the input. Therefore the described exemplary tone invalidation logic may shift the filtered output to minimize phase discontinuities in the processed signal.

One of skill in the art will appreciate that a variety of methods for invalidating DTMF signals may be utilized to minimize tone leakage into the voice path. For example, the twist of a DTMF signal, defined as the amplitude ratio of a pair of DTMF tones, is required to be within a specified range. Therefore, the tone invalidation logic may substantially alter (amplify or attenuate) the amplitude of the low or high tone such that the twist of the tone pair doesn't satisfy the twist requirement specified in the appropriate protocol and a valid tone is not detected on the far end.

In the described exemplary embodiment, the processed signal is coupled to a voice encoder 240 that may comprise, for example, a straight 16 bit PCM encoder or any voice encoder that supports one or more of the standards promulgated by ITU. The encoded digital voice samples are formatted into a voice packet (or packets) by a packetization engine 250. The packetization engine 250 formats the voice packets according to an applications protocol and outputs formatted packets to a host (not shown). The packetization engine 250 may generate the entire voice packet or just the voice portion of the voice packet. In particular, a fully packetized system with all the protocol headers may be implemented, or alternatively, only the voice portion of the packet will be delivered to the host.

By way of example, for VoIP, it is reasonable to create the real-time transport protocol (RTP) encapsulated packet with the packetization engine, but have the remaining transmission control protocol/Internet protocol (TCP/IP) stack residing in the host. In the described exemplary embodiment, the voice packetization functions reside in the packetization engine. The voice packet should be formatted according to the particular standard, although not all headers or all components of the header need to be constructed.

In the described exemplary embodiment, the tone validation logic 210 analyzes the time sequence of events and compares tie tone on and tone off periods for a given tone to the predetermined standards to determine whether a valid DTMF digit is present. In the described exemplary embodiment, the tone validation logic 220 forwards a tone detection 220(*b*) event to the voice encoder 240 when a DTMF digit has been validated. In the described exemplary embodiment, the voice encoder 240 terminates operation and DTMF detection events are preferably reported to the hogs.

This allows the host, for example, to convert a DTMF sequence of keys to a destination address and to support call routing via DTMF. The described exemplary embodiment, therefore provides a method and apparatus for substantially reducing tone leakage into the voice path that does not require signal queuing or delay that might otherwise introduce jitter or other undesirable artifacts into the system.

Figure 5A:
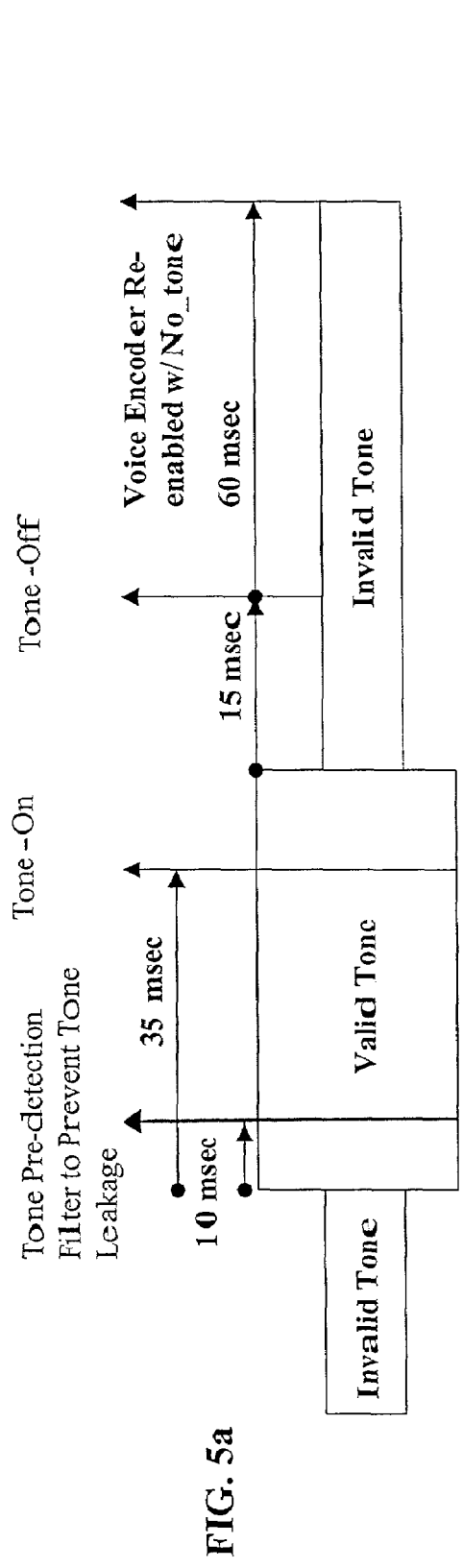
FIGS. 5*a* and 5*b* graphically illustrate the timing of the DTMF tone relay of FIG. 3 in accordance with an exemplary embodiment of the present invention.
Figure 5B:
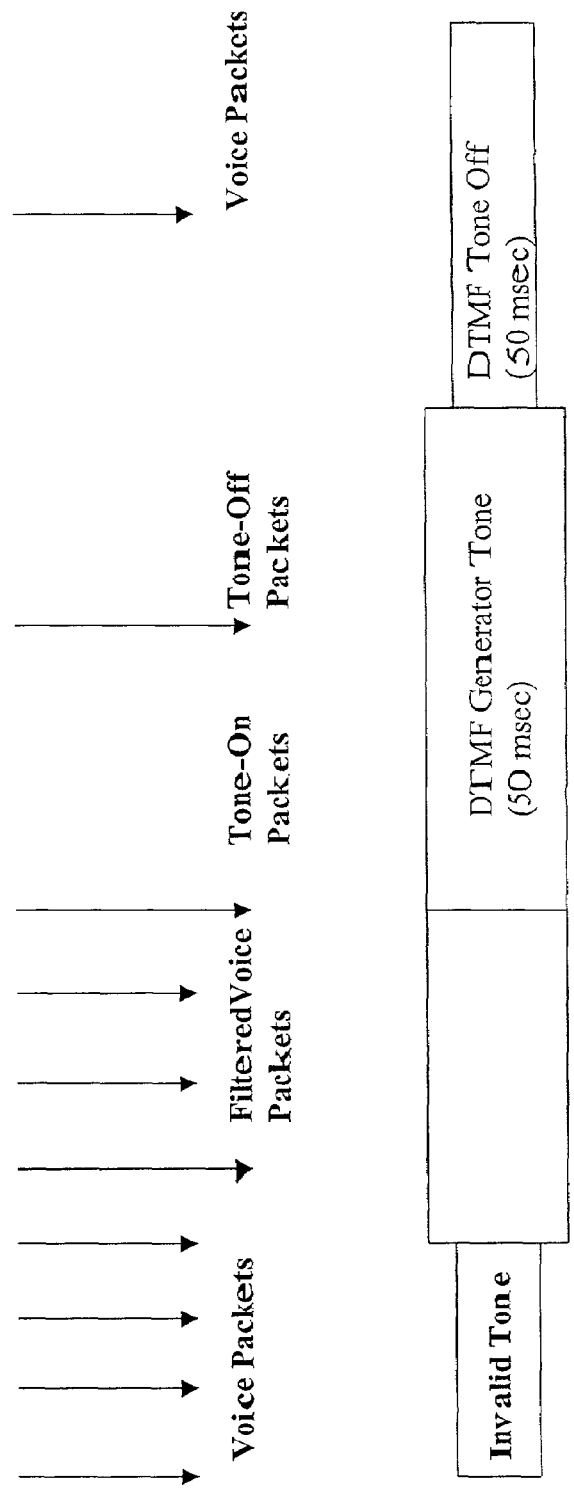

FIGS. 5*a* and 5*b* graphically illustrates the timing of an exemplary packet tone relay in a DTMF detector embodiment. FIG. 5*a* illustrates the original audio path wherein an incoming signal is initially received and parallel processed by a tone detector and encoded by a voice encoder. In this example, the tone validation logic forwards a tone pre-detection flag to the tone invalidation logic after a valid tone has been detected for about 10 msec. The tone invalidation logic begins to filter the high frequency group to invalidate the tone in the incoming signal in response to the pre-detection flag. In accordance with an exemplary embodiment the voice encoder continues to encode the filtered speech and filtered voice packets are communicated across the network without substantial delay or jitter.

In this example, the tone relay continues to detect a valid DTMF signal for another 25 msec after which the tone so validation logic forwards a tone detection event to the voice encoder. In the described exemplary embodiment, the voice encoder terminates operation and DTMF events are preferably reported to the host. The host communicates tone-on packets across the network for a predetermined period of time. The voice encoder may then be re-enabled and tone-off packets may be communicated across the network for a predetermined period of time.

The regenerated audio path on the far end of the network is illustrated in FIG. 5*b*. Unfiltered voice packets are continually received and processed on the far end of the network until the pre-detection flag is generated 10 msec into what could be a valid tone on the near end of the network. At this point, substantially delay free filtered voice packets having the upper frequency tone group removed are received and processed on the far end of the network. In accordance with an exemplary embodiment valid DTMF digits are not detected in the filtered voice packets.

After approximately 35 msec tone-on packets are received at the far end of the network tone as a result of the detection event generated on the near end of the network. In accordance with an exemplary embodiment, a DTMF tone generator converts the DTMF signals into a DTMF tone suitable for a standard digital or analog telephone. In the described exemplary embodiment the width of the DTMF tone exceeds the minimum duration required to guarantee a tone detection, on the order of about 40 msec for a DTMF tone. The DTMF tone is followed a DTMF tone off pulse as required to ensure valid tone detection.

Although an exemplary embodiment of the present invention has been described, it should not be construed to limit the scope of the appended claims. Those skilled in the art will understand that various modifications may be made to the described embodiment. For example, the described exemplary embodiment illustrates a dual tone relay that detects and removes DTMF tones from an incoming communications channel, wherein each tone is one of a plurality of predetermined tones from two respective frequency groups. However, the present invention may comprise a multi tone multi frequency (MTMF) detector for detecting a greater number of tones in a received signal, i.e., two or more tones. The two or more tones may be from two or more different frequency groups or from a single frequency group, as desired. Thus the system and method of the present invention may be used for detecting any number of tones in a received signal.

For example, the present invention may be utilized in accordance with multi-frequency (MF) tone plans such as for example, MF-R1, MF-R2-Forward, and MF-R2-Backward as defined by Bellcore GR-506-CORE and various ITU specifications. Multi-frequency tones are typically used in inter-switching-system transmission facilities. An MF tone relay may be utilized in the transmission of a called number from an SPCS to another switching system, transmission of the calling number (ANI information) from an SPCS to a an operator system or other network equipment that requires calling number information or for the control of public coin-operated telephones from operator systems. However, MF tones are typically not grouped into high and low frequency groups. Therefore, tone invalidation logic may filter or substantially attenuate the pre-detected tones prior to transmission to the far end of the network.

Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method for relaying signaling tones in a communication signal across a network, comprising the steps of:
   pre-detecting said tones;
   validating at least one of said tones;
   processing said communication signal to invalidate said tones in response to said tone pre-detection;
   forwarding said processed communication signal across said network; and
   forwarding tone-on signals across said network in response to said validation, wherein the step of processing said communication signal to invalidate said tones comprises shifting frequency of said tone and/or adding an additional tone to said communication signal at a discrete frequency.

2. The method of claim 1 wherein said tones comprise dual tone signals comprising a low frequency tone group and a high frequency tone group.

3. The method of claim 2 wherein the step of processing said communication signal to invalidate said tones further comprises filtering said high frequency tone group.

4. The method of claim 1 further comprising encoding said processed signal in accordance with an application protocol, wherein said encoded signal is forwarded across said network.

5. The method of claim 1 wherein the step of pre-detecting said tones comprises determining characteristic of at least one of said tones and comparing said characteristic to one or more predetermined thresholds, wherein said tone is pre-detected in accordance with said comparison.

6. The method of claim 5 wherein the step of determining a characteristic of at least one of said tones comprises determining power of said tone.

7. The method of claim 5 wherein the step of determining a characteristic of at least one of said tones comprises determining frequency of said tone.

8. The method of claim 1 wherein the step of validating at least one of said tones comprises comparing duration of said tone to a predetermined threshold.

9. A tone relay for communicating signaling tones across a network, comprising:
   validation logic coupled to a tone detector for pre-detecting tones in an incoming signal;
   invalidation logic for processing said incoming signal to invalidate said tones in response to said tone pre-detection; and
   an encoder for encoding said processed signal in accordance with an applications protocol, wherein said tone invalidation logic comprises a signal generator for adding an additional tone to said incoming signal at a discrete frequency.

10. The tone relay of claim 9 wherein said tones comprise dual tone signals comprising a low frequency tone group and a high frequency tone group.

11. The tone relay of claim 10 wherein said invalidation logic further comprises a band stop filter for filtering said high frequency tone group.

12. The tone relay of claim 10 wherein said invalidation logic further comprises a band stop filter for filtering said low frequency tone group.

13. The tone relay of claim 9 wherein said validation logic analyzes one or more characteristics of a pre-detected tone among the tones to verify tone validity, and wherein a host forwards a tone-on signal across said network in accordance with said tone validation.

14. The tone relay of claim 13 wherein said validation logic comprises state machine logic for verifying duration of said pre-detected tones, and wherein a host forwards a tone-on signal across said network in accordance with said tone validation.

15. The tone relay of claim 9 wherein said encoder comprises a voice encoder.

16. A data transmission system, comprising:
   a telephony device that outputs a signal; and
   a signal processor comprising validation logic coupled to a tone detector for pre-detecting tones in said signal, invalidation logic for processing said signal to invalidate said tones in response to said tone pre-detection, and an encoder for encoding said processed signal in accordance with an applications protocol,
   wherein said encoder comprises a voice encoder, and
   wherein said tone invalidation logic comprises a signal generator for adding an additional tone to said incoming signal at a discrete frequency.

17. The data transmission system of claim 16 wherein said tones comprise dual tone signals comprising a low frequency tone group and a high frequency tone group.

18. The data transmission system of claim 17 wherein said invalidation logic further comprises a band stop filter for filtering said high frequency tone group.

19. The data transmission system of claim 17 wherein said invalidation logic further comprises a band stop filter for filtering said low frequency tone group.

20. The data transmission system of claim 16 wherein said validation logic analyzes one or more characteristics of a pre-detected tone among the tones to verify tone validity, and wherein a host forwards a tone-on signal across said network in accordance with said tone validation.

21. The data transmission system of claim 20 wherein said validation logic comprises state machine logic for verifying duration of said pre-detected tones, and wherein a host forwards a tone-on signal across said network in accordance with said tone validation.

22. A tone relay for communicating signaling tones across a network, comprising:
   means for pre-detecting tones in an incoming signal;
   means for invalidating said tones in response to said tone pre-detection; and
   means for encoding the incoming signal having invalid tones in accordance with an applications protocol, wherein said means for invalidating said tones comprises a signal generator for adding an additional tone to said incoming signal at a discrete frequency and/or means for shifting frequency of said tone.

23. The tone relay of claim 22 wherein said tones comprise dual tone signals comprising a low frequency tone group and a high frequency tone group.

24. The tone relay of claim 23 wherein said means for invalidating said tones further comprises a band stop filter for filtering said high frequency tone group.

25. The tone relay of claim 23 wherein said means for invalidating said tones further comprises a band stop filter for filtering said low frequency tone group.

26. The tone relay of claim 22 further comprising means for analyzing one or more characteristics of a pre-detected tone to verify tone validity, and means for forwarding a tone-on signal across said network in accordance with said tone validation.

27. The tone relay of claim 22 wherein said encoding means comprises a voice encoder.

28. The tone relay of claim 22 further comprising means for buffering said incoming signal and wherein said means for invalidating said tones further comprises means for re-transmitting buffered signal in accordance with pre-detection of said tones.

* * * * *